United States Patent [19]
Morita

[11] Patent Number: 5,461,568
[45] Date of Patent: Oct. 24, 1995

[54] TORQUE SPLIT CONTROL APPARATUS

[75] Inventor: Koji Morita, Hiratsuka, Japan

[73] Assignee: Nissan Motor Co., Ltd., Yokohama, Japan

[21] Appl. No.: 63,821

[22] Filed: May 20, 1993

[30] Foreign Application Priority Data

May 20, 1992 [JP] Japan .................. 4-127227

[51] Int. Cl.⁶ .................................. B60K 17/348
[52] U.S. Cl. .................. 364/426.03; 180/197; 180/233
[58] Field of Search ............... 364/426.02, 426.03; 180/197, 233, 248, 249

[56] References Cited

U.S. PATENT DOCUMENTS

| 4,754,834 | 7/1988 | Ozaki | 180/233 |
|---|---|---|---|
| 4,757,870 | 7/1988 | Torii | 180/233 |
| 4,773,500 | 9/1988 | Naito | 180/233 |
| 4,776,424 | 10/1988 | Naito | 180/233 |
| 4,846,298 | 7/1989 | Naito | 180/233 |
| 4,874,056 | 10/1989 | Naito | 180/233 |
| 4,887,689 | 12/1989 | Naito | 180/233 |
| 4,989,686 | 2/1991 | Miller et al. | 364/426.03 |
| 5,060,747 | 10/1991 | Eto | 180/197 |
| 5,168,955 | 12/1992 | Naito | 180/248 |
| 5,178,231 | 1/1993 | Watanabe et al. | 180/197 |
| 5,197,008 | 3/1993 | Itoh et al. | 180/197 |
| 5,243,526 | 9/1993 | Ito et al. | 364/426.02 |
| 5,245,542 | 9/1993 | Itoh et al. | 364/426.02 |
| 5,255,192 | 10/1993 | Ito et al. | 364/426.02 |

FOREIGN PATENT DOCUMENTS 4-103433  4/1992  Japan .

Primary Examiner—Gary Chin
Attorney, Agent, or Firm—Lowe, Price, LeBlanc & Becker

[57] ABSTRACT

A torque split control apparatus for use with 4WD type vehicle. The drive from the engine is transmitted to the primary drive wheels of the vehicle and to the secondary drive wheels of the vehicle through a torque distributing clutch capable of varying a torque transmitted to the secondary drive wheels. A wheel speed difference between speeds of rotation of the primary and secondary drive wheels, a vehicle speed and a difference between the diameters of the tires of the primary and secondary drive wheels are sensed. A dead zone is calculated as a function of tire diameter difference and vehicle speed. The calculated dead zone increases as the sensed tire diameter difference increases and as the sensed vehicle speed increases. The calculated dead zone is subtracted from the calculated wheel speed difference to correct the wheel speed difference. The corrected wheel speed difference is used to calculate a torque. A smaller one of the calculated torque and a maximum torque is selected. The torque distributing clutch is controlled to transmit the selected torque to the secondary drive wheels.

3 Claims, 6 Drawing Sheets

TORQUE SPLIT CONTROL APPARATUS

BACKGROUND OF THE INVENTION

This invention relates to a torque split control apparatus for use with a 4WD vehicle supported on a pair of primary drive wheels and a pair of secondary drive wheels.

For example, Japanese Patent Kokai No. 4-103433 discloses a torque split control apparatus for use with a 4WD vehicle. The conventional torque split control apparatus is arranged to transmit the drive from the engine to the primary drive wheels of the vehicle and to the secondary drive wheels of the vehicle through a torque distributing clutch capable of varying a torque transmitted to the secondary drive wheels. A difference between the diameters of the tires of the primary and secondary drive wheels is sensed to calculate a desired torque transmitted through the torque distributing clutch to the secondary drive wheels. A dead zone is calculated as a function of tire diameter difference and vehicle speed. The calculated dead zone increases as the sensed tire diameter difference increases and as the sensed vehicle speed increases. The calculated dead zone is subtracted from the calculated wheel speed difference to correct the wheel speed difference. A clutch torque is calculated based upon the corrected wheel speed difference. The torque distributing clutch is controlled to transmit the calculated clutch torque to the secondary drive wheels.

With the conventional torque split control apparatus, the dead zone set as a function of tire diameter difference and vehicle speed retains the clutch torque at a smaller value than obtained with no tire diameter difference. However, the clutch torque increases with no limitation as the tire diameter difference increases and as the vehicle speed increases to damage the benefits of good transfer and differential durability, minimized vibration and fuel economy.

SUMMARY OF THE INVENTION

Therefore, it is a main object of the invention to provide an improved torque split control apparatus which can ensure the benefits of good transfer and differential durability, minimized vibration and fuel economy.

There is provided, in accordance with the invention, a torque split control apparatus for use with an automotive vehicle including an engine for producing a drive. The automotive vehicle is supported on a pair of primary drive wheels provided with tires having a diameter and a pair of secondary drive wheels provided with tires having a diameter. The torque split control apparatus comprises means for transmitting the drive from the engine to the primary drive wheels and to the secondary drive wheels through a torque distributing clutch capable of varying a torque transmitted to the secondary drive wheels, means for sensing a wheel speed difference between speeds of rotation of the primary and secondary drive wheels, means for sensing a vehicle speed, means for sensing a difference between the diameters of the tires of the primary and secondary, drive wheels, means for calculating a dead zone as a function of tire diameter difference and vehicle speed. The calculated dead zone increases as the sensed tire diameter difference increases and as the sensed vehicle speed increases. The torque split control apparatus also includes means for subtracting the calculated dead zone from the calculated wheel speed difference to correct the wheel speed difference, means for calculating a torque based upon the corrected wheel speed difference, means for selecting a smaller one of the calculated torque and a maximum torque, and means for controlling the torque distributing clutch to transmit the selected torque to the secondary drive wheels.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
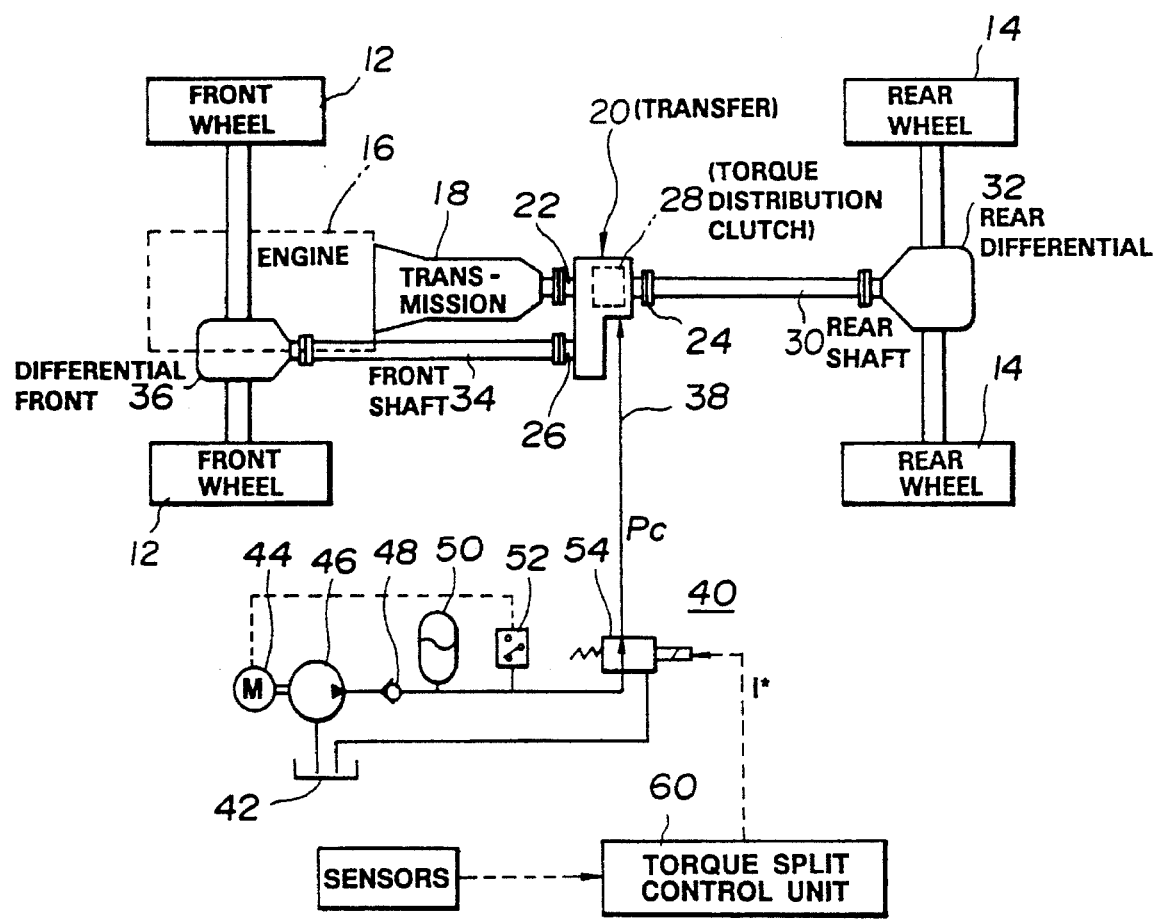
FIG. 1 is a schematic block diagram showing one embodiment of a torque split control apparatus made in accordance with the invention.

With reference to the drawings, and in particular to FIG. 1, there is shown a schematic block diagram of a torque split (driving force distribution) control apparatus embodying the invention. An automotive vehicle, generally designated by the numeral 10, is supported on a pair of front road wheels 12 and a pair of rear road wheels 14. The vehicle 10 includes an internal combustion engine 16 from which the drive is transmitted through a transmission 18 to a transfer 20. The transfer 20 has an input shaft 22 coupled to the transmission 18, a first output shaft 24 coupled to a rear propeller shaft 30 and a second output shaft 26 coupled to a front propeller shaft 34. The transfer 20 directly transmits the drive from the transmission 22 to the rear propeller shaft 30. The drive is then taken by a rear differential 32 which divides the drive equally between the two rear road wheels 14. The transfer 20 also includes a transfer clutch (torque distribution clutch) 28 through which the front propeller shaft 34 is connected to the transmission 18. Thus, the drive from the transmission 18 is transmitted through the transfer clutch 28 to the front propeller shaft 34. The drive is then taken by a front differential 36 which divides the drive equally between the two front road wheels 12. The transfer clutch 28, which may be taken in the form of a wet type multiple disc clutch, is engaged to transmit the torque from the transmission 18 to the front propeller shaft 34 when it receives a control pressure Pc in the form of a hydraulic pressure supplied through a conduit 38 from a pressure source 40. In the absence of the control pressure Pc, the transfer clutch 28 is disengaged to disconnect the torque from the transmission 18 from the front propeller shaft 34. The force under which the transfer clutch 28 is engaged, that is, the ratio of the torques distributed to the front and rear road wheels 12 and 14 of the vehicle 10 is determined by the level of the control pressure Pc supplied from the pressure source 40 through the conduit 38 to the transfer clutch 28. The transfer 20 and the transfer clutch 28 are described in detail, and is incorporated therein by reference, in commonly-assigned, U.S. Pat. Nos. 4,754,834, 4,757,870, 4,773,500, 4,776,424, 4,846,298, 4,874,056 and 4,887,689.

The pressure source 40 includes an oil pump 46 operated by an electric motor 44 to suck oil from an oil reservoir 42. The oil pressure (primary pressure) discharged from the oil pump 46 is introduced through a check valve 48 to charge an accumulator 50. A relief switch 52 is provided to monitor the oil pressure (secondary pressure) charged in the accumulator 50. The relief switch 52 produces a signal to stop the electric motor 44 when the secondary pressure exceeds a predetermined value. Thus, the secondary pressure is maintained at the predetermined value. The regulated pressure is fed through a solenoid valve 54 to the conduit 38. The solenoid valve 54 responds to a dither current i* fed thereto from a torque split control unit 60 by controlling the level of the control pressure Pc fed through the conduit 38 to the transfer clutch 28.

Figure 2:
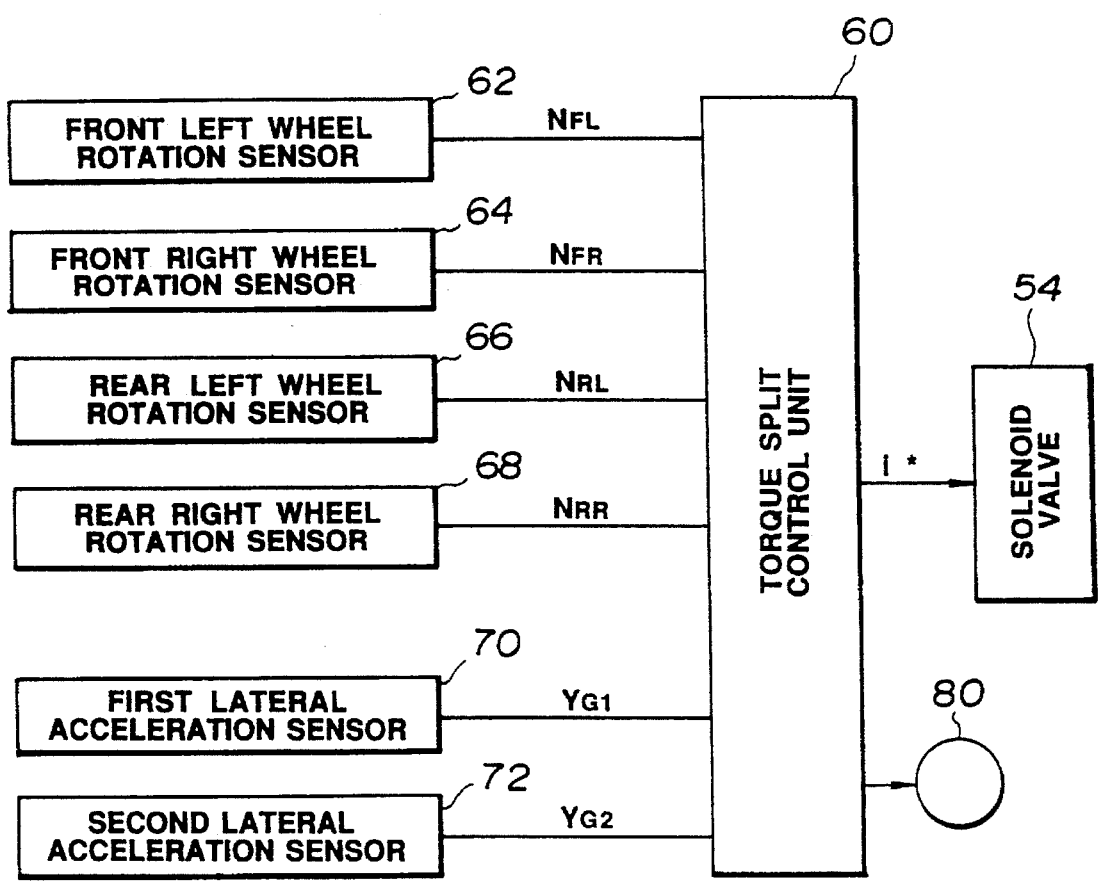
FIG. 2 is a schematic block diagram showing the torque split control unit used in the torque split control apparatus of FIG. 1.

The level of the control pressure Pc introduced through the conduit 38 to the transfer clutch 28, this being determined by the magnitude of the dither current i* supplied from the torque split control unit 60 to the solenoid valve 54, is repetitively determined from calculations performed by a digital computer, these calculations being based upon various conditions that are sensed during its operation. These sensed conditions include front road wheel rotational speed, rear road wheel rotational speed, and lateral acceleration. Thus, a front left road wheel rotational speed sensor 62, a front right road wheel rotational speed sensor 64, a rear left road wheel rotational speed sensor 66, a rear right road wheel rotational speed sensor 68, a first lateral acceleration sensor 70 and a second lateral acceleration sensor 72 are connected to the torque split control unit 60, as shown in FIG. 2. An electric lump 80 is connected to the torque split control unit 60 for providing a visible indication when the tires of the front and rear road wheels of the vehicle 10 have different diameters.

The torque split control unit 60 may employ a digital computer which includes a central processing unit (CPU), a random access memory (RAM), a read only memory (ROM), and an input/output control circuit (I/O). The central processing unit communicates with the rest of the computer via data bus. The read only memory contains the program for operating the central processing unit and further contains appropriate data in look-up tables used in calculating an appropriate value for the dither current i* supplied to the solenoid valve 54. A control word specifying a desired dither current magnitude is periodically transferred by the central processing unit to the input/output control circuit. The input/output control circuit converts the received control word into a corresponding dither current i* for application to the solenoid valve 54.

Figure 3:
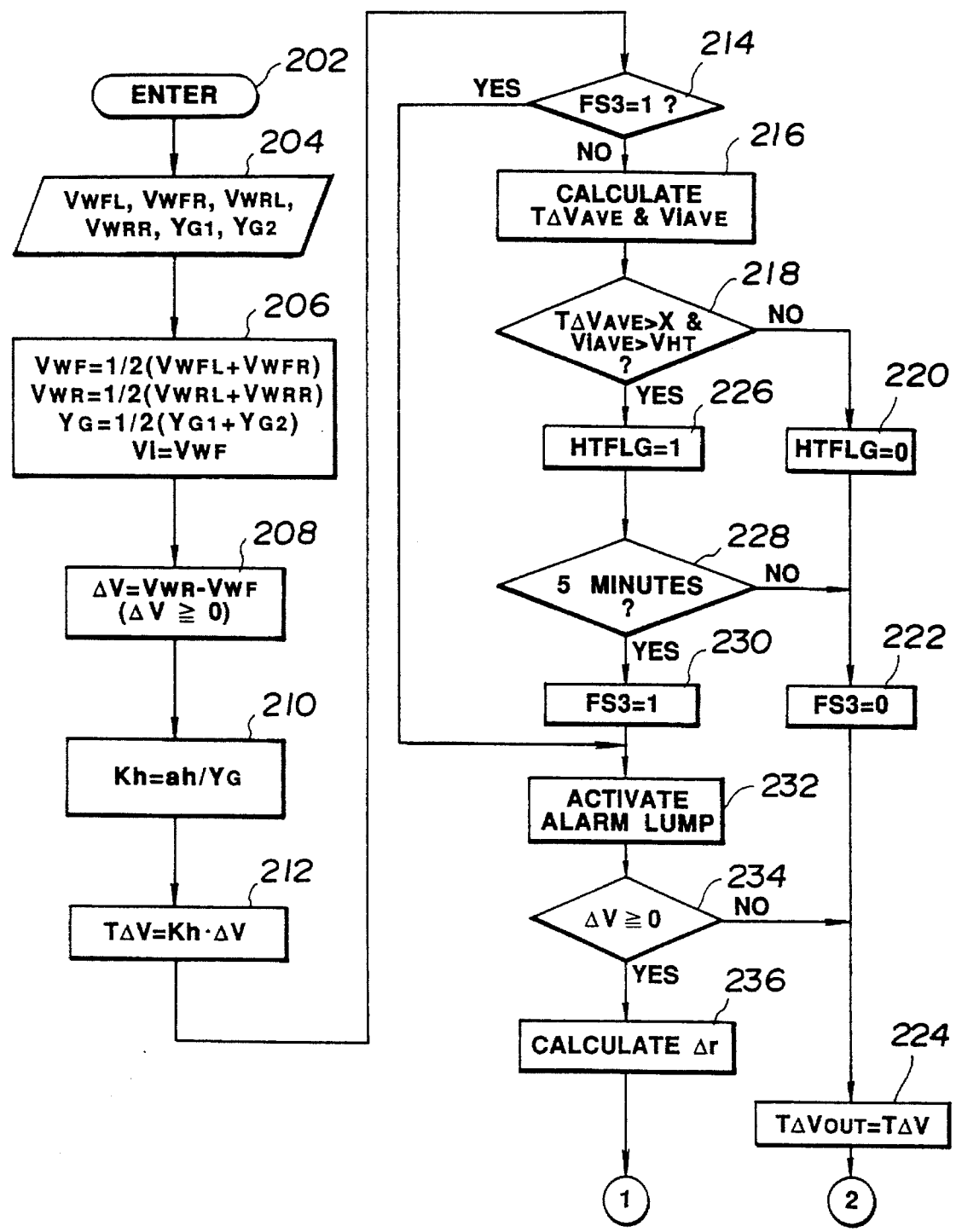
FIGS. 3 and 4 are flow diagrams showing the programming of the digital computer used in the torque split control unit of FIG. 2.
Figure 4:
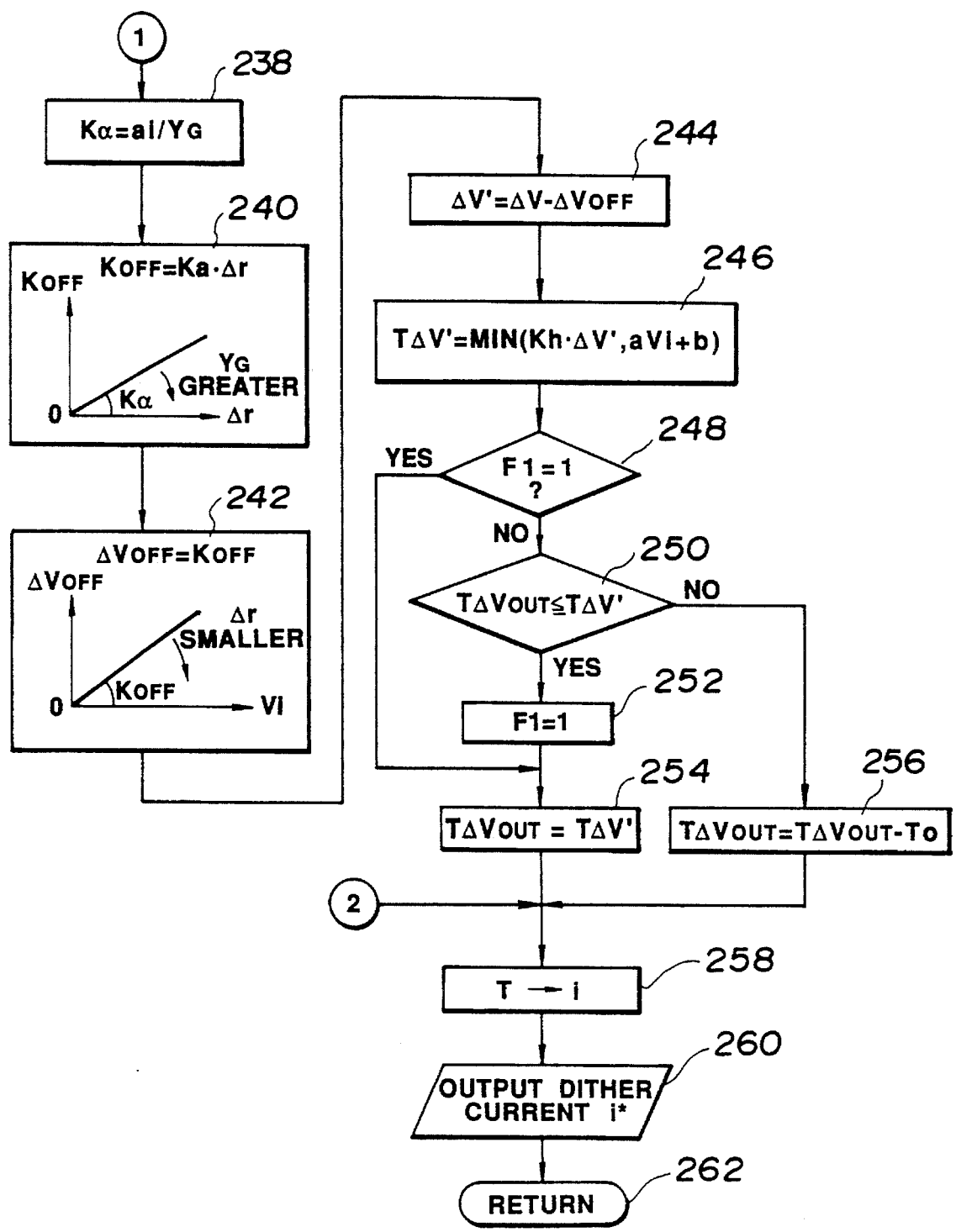

FIGS. 3 and 4 are flow diagrams showing the programming of the digital computer as it is used to calculate an appropriate value for the dither current i* supplied to the solenoid valve 54. The computer program is entered at the point 202. At the point 204 in the program, the central processing unit reads the front left road wheel rotational speed $V_{WFL}$, the front right road wheel rotational speed $V_{WFR}$, the rear left road wheel rotational speed $V_{WRL}$, the rear right road wheel rotational speed $V_{WRR}$, the first lateral acceleration $Y_{G1}$ and the second lateral acceleration $Y_{G2}$. At the point 206 in the program, the front road wheel rotational speed $V_{WF}$ is calculated by averaging the front left and right road wheel rotational speeds and $V_{WFR}$, the rear road wheel rotational speed $V_{WR}$ is calculated by averaging the rear left and right road wheel rotational speeds $V_{WRL}$ and $V_{WRR}$, and the lateral acceleration $Y_G$ by averaging the first and second lateral accelerations $Y_{G1}$ and $Y_{G2}$. The front road wheel rotational speed $V_{Wf}$ is used to set the vehicle longitudinal speed $V_i$ ($V_i = V_{WF}$).

At the point 208 in the program, the front and rear road wheel rotational speed difference $\Delta V$ of the front road wheel rotational speed $V_{WF}$ from the rear road wheel rotational speed $V_{WR}$ is calculated. At the point 210 in the program, the control gain $K_h$ of the clutch torque output value $T\Delta V_{OUT}$ with respect to the front and rear road wheel rotational speed difference a $\Delta V$ (or corrected front and rear road wheel rotational speed difference value $\Delta V''$ to be described later in connection with the point 244) is calculated based on the reciprocal of the lateral acceleration $Y_G$ from the equation as follows:

$$K_h = \alpha_h / Y_G$$

where $K_h < \beta_h$. For example, $\alpha_h = 10$ when $\alpha_h = 1$. At the point 212 in the program, the clutch torque $T\Delta V$ is calculated by multiplying the control gain $K_h$ and the front and rear road wheel rotational speed difference $\Delta V$.

At the point 214 in the program, a determination is made as to whether or not a different diameter tire detecting flag FS3 is set at 1. If the answer to this question is "yes", then it means that the tires of the front and rear road wheels 12 and 14 of the vehicle 10 have different diameters and the program proceeds to the point 232. Otherwise, the program proceeds to the point 216 where the central processing unit calculates the average clutch torque value $T\Delta V_{AVE}$ over a period of 5 seconds and the average vehicle speed value $V_{iAVE}$ over a period of 5 seconds. At the point 218 in the program, a determination is made as to whether or not the average clutch torque value $T\Delta V_{AVE}$ exceeds a predetermined value X and the average vehicle speed value $V_{iAVE}$ exceeds a predetermined value $V_{HT}$. If the answer to this question is "no", then the program proceeds to the point 220 where a high clutch torque discrimination flag HTFLAG is cleared to 0. After the high clutch torque discrimination flag HTFLAG is cleared, the program proceeds to the point 222 where the different diameter tire detection flag FS3 is cleared to 0 and then to the point 224 where the clutch torque output value $T\Delta V_{OUT}$ is set at a value equal to the clutch torque TAD calculated at the point 212. Following this, the program proceeds to the point 258.

If the answer to the question inputted at the point 218 is "yes", then the program proceeds to the point 226 where the high clutch torque discrimination flag HTFLAG is set at 1. At the point 228 in the program, a determination is made as to whether or not the length of time the high clutch torque discrimination flag HTFLAG remains set at 1 exceeds 5 minutes. If the answer to this question is "yes", then it is judged that the tires of the front and rear road wheels 12 and 14 of the vehicle 10 have different diameters and the program proceeds to the point 230 where the different diameter tire detection flag FS3 is set at 1 and then to the point 232 where a command is produced to activate the lump 80 so as to provide a visual indication to the driver that the tires of the front and rear road wheels of the vehicle have different diameters. Otherwise, the program proceeds to the point 222.

Figure 5:
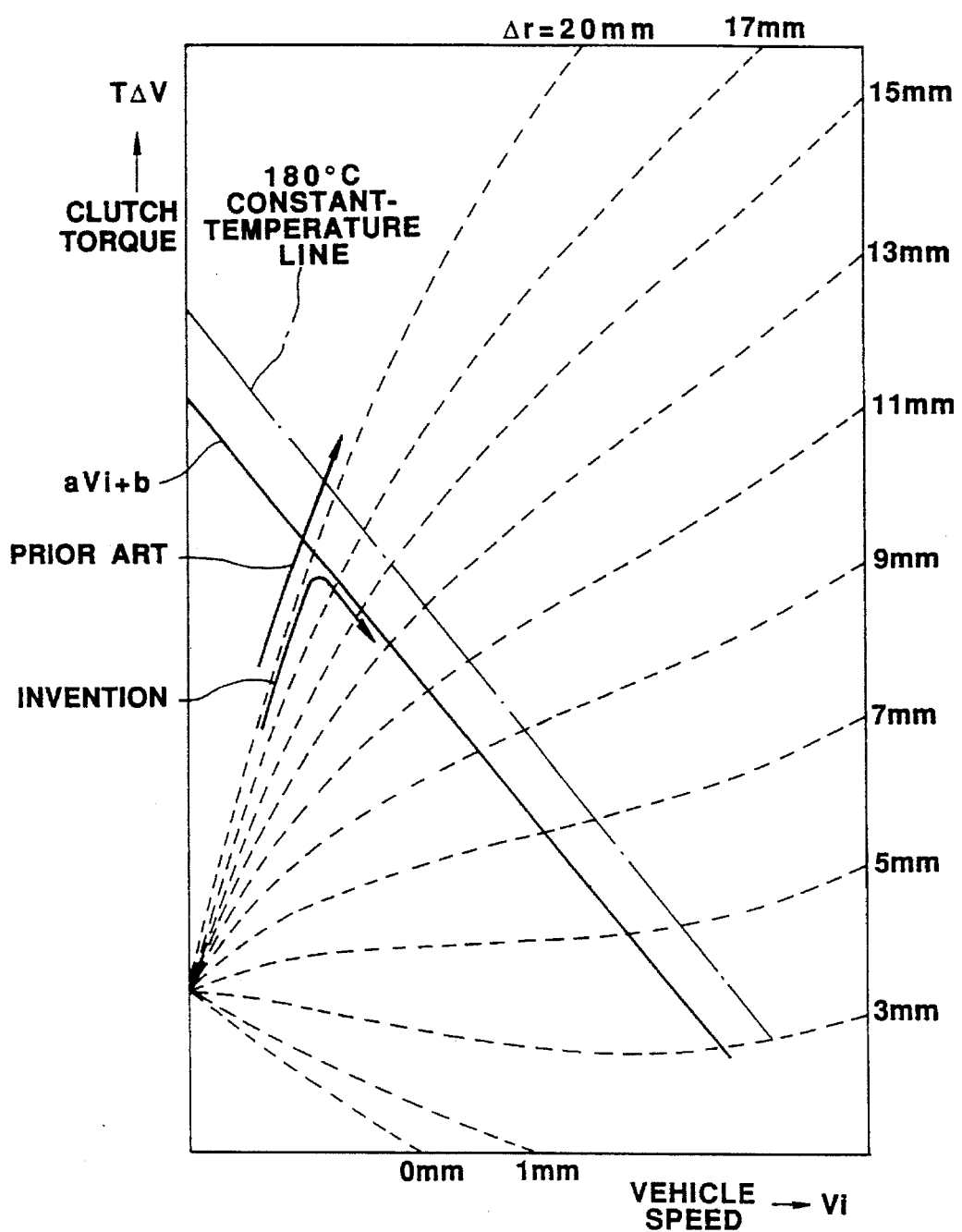
FIG. 5 is a graph showing a tire diameter difference map with a maximum clutch torque indication line.

At the point 234 in the program, a determination is made as to whether or not the front and rear road wheel rotational speed difference $\Delta V$ is positive. If the answer to this question is "yes", then the program proceeds to the point 236. Otherwise, it means that a difference occurs between the front and rear road wheel rotational speeds without slippage on the drive wheels and the program proceeds to the point 224. At the point 236 in the program, the tire diameter difference $\Delta r$ is calculated from a relationship programmed into the computer. This relationship defines tire diameter difference $\Delta r$ as a function of average vehicle speed value $V_{iAVE}$ and average clutch torque value $T\Delta V_{AVE}$, as shown in FIG. 5, where the calculated tire diameter difference $\Delta r$ has a greater value at a greater average clutch torque value $T\Delta V_{AVE}$ in spite of the fact that the average vehicle speed value $V_{iAVE}$ is small. The relationship may be obtained experimentally or derived empirically. After the tire diameter difference $\Delta r$ has been calculated, the program proceeds to the point 238 where a coefficient $K_a$ is calculated as $K_a = \alpha_i/Y_G$ (where $K_a = \beta_i$ when $Y_G = 0$). At the point 240 in the program, the setting gain $K_{OFF}$ of the dead zone $\Delta V_{OFF}$ of the front and rear road wheel rotational speed difference is calculated as $K_{OFF} = K_a = \Delta r$. The smaller the setting gain $K_{OFF}$, the greater the lateral acceleration $Y_G$ and the greater the tire diameter difference $\Delta r$. At the point 242 in the program the dead zone $\Delta V_{OFF}$ is calculated based on the setting gain $K_{OFF}$ and the vehicle speed $V_i$ as $\Delta V_{OFF} = K_{OFF}\cdot V_i$. At the point 244 in the program, the front and rear road wheel rotational speed difference $\Delta V$ is corrected to calculate a corrected value $\Delta V'$ as $\Delta V' = \Delta V' - \Delta V_{OFF}$ where $\Delta V' \geq 0$). At the point 246 in the program, a smaller one of the clutch torque ($K_h\cdot\Delta V'$) and a maximum clutch torque ($a\cdot V_i + b$ where a is a negative constant and b is a positive constant, as shown in FIG. 5) is selected to set the unit protection torque $T\Delta V''$.

At the point 248 in the program, a determination is made as to whether or not a shift flag F1 is set at 1 to indicate that the clutch torque $T\Delta V$ has been shifted to the unit protection torque $T\Delta V'$ after the tires of the front and rear road wheels 12 and 14 of the vehicle 10 is detected to have different diameters. If the answer to this question is "yes", then the program proceeds to 254. Otherwise, the program proceeds to another determination step at the point 250. This determination is whether the clutch torque output value $T\Delta V_{OUT}$ is equal to or less than the unit protection torque $T\Delta V''$. If the answer to this question is "yes", then the program proceeds to the point 252 where the shift flag is set at 1 and then to the point 254 where the clutch torque output value $T\Delta V_{OUT}$ is set at a value equal to the unit protection torque $T\Delta V'$. Following this the program proceeds to the point 258. If the answer to the question inputted at the point 250 is "no", then the program proceeds to the point 256 where the clutch torque output value $T\Delta V_{OUT}$ is decreased by a predetermined value $T_O$. This means that the clutch torque output value $T\Delta V_{OUT}$ decreases by the predetermined value $T_O$ every time the program is executed. Following this, the program proceeds to the point 258.

At the point 258 in the program, a torque-current characteristic table is used to convert the clutch torque output value $T\Delta V_{OUT}$ into a corresponding current value i. At the point 260 in the program, a dither current i* (for example, i±0.1A, 100 Hz) is supplied to the solenoid valve 54. Following this, the program proceeds to the point 262 where the program is returned to the point 204.

Figure 6:
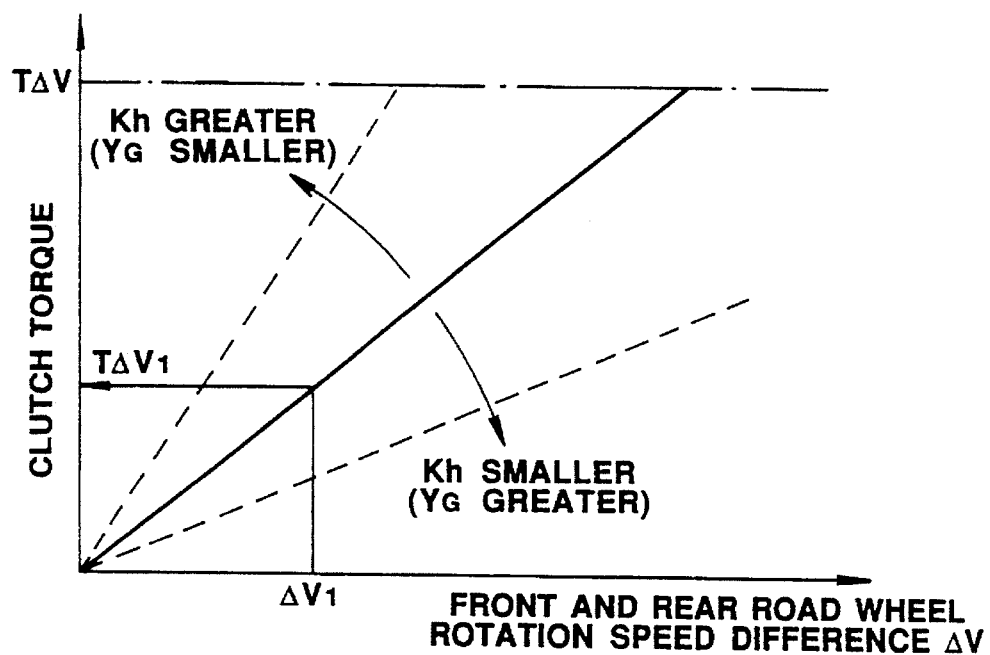
FIG. 6 is a graph of clutch torque versus front and rear road wheel rotational speed difference for no tire diameter difference.

The operation of the torque split control apparatus of the invention will described further. At a high speed condition where the average vehicle speed value $V_{iAVE}$ exceeds the predetermined value $V_{HT}$, it is judged that no difference exists between the diameters of the tires of the front and rear road wheels 12 and 14 of the vehicle 10 when the length of time the average clutch torque value $T\Delta V_{AVE}$ remains above the predetermined torque X is less than 5 minutes. In this case, the clutch torque output value $T\Delta V_{OUT}$ is set at a value equal to the clutch torque $T\Delta V$ which is directly proportional to a difference $\Delta V$ between the front and rear road wheel rotational speeds. Thus, the transfer clutch 28 is engaged under the force corresponding to the clutch torque output value $T\Delta V_{OUT}$, as shown in FIG. 6, so that the drive from the engine 16 is distributed to the front road wheels 12 of the vehicle 10 according to the front and rear road wheel rotational speed difference $\Delta V$ (drive wheel slip information).

Figure 7:
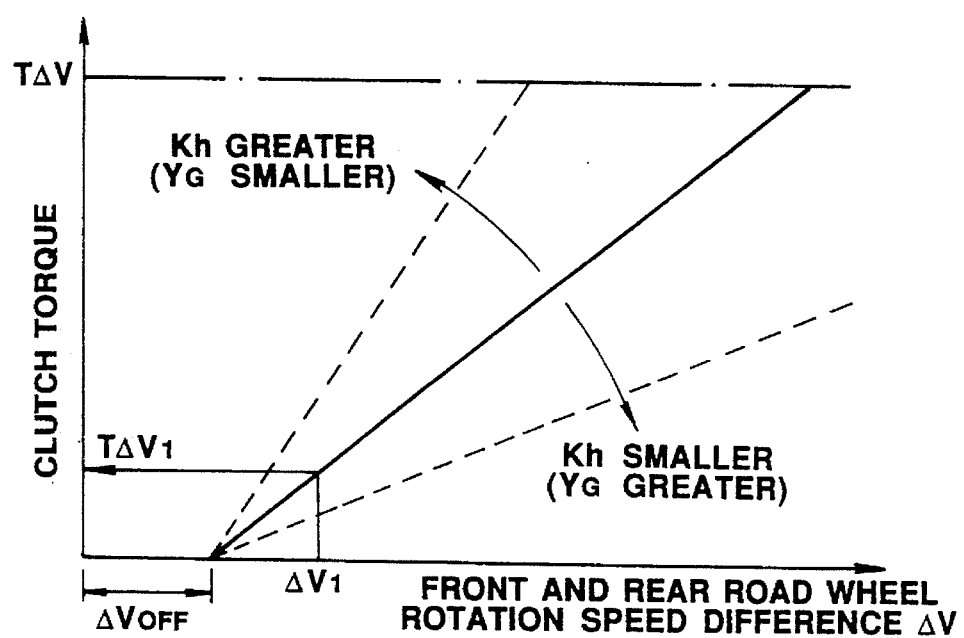
FIG. 7 is a graph of clutch torque versus front and rear road wheel rotational speed difference for tire diameter differences.

When the tires of the front and rear road wheels 12 and 14 of the vehicle 10 are detected to have different diameters, the unit protection torque $T \neq V''$ is set at a value equal to the clutch torque ($K_h\cdot\Delta V''$) calculated based on the corrected value $\Delta V''$ of the front and rear road wheel rotational speed difference or at a value equal to the maximum clutch torque ($a\cdot Vi + b$) decreasing as the vehicle speed $V_i$ increases. For example, when the vehicle 10 is running with a small difference between the diameters of the tires of the front and rear wheels 12 and 14 of the vehicle 10 or when the vehicle 10 is running at a low speed with a great difference between the diameters of the front and rear wheels 12 and 14 of the vehicle 10, the unit protection torque $T\Delta V''$ is set at a value equal to the clutch torque ($K_h\cdot\Delta V''$) calculated based on the corrected value $\Delta V''$ of the front and rear road wheel rotational speed difference. In this case, the corrected front and rear road wheel rotational speeds difference value $\Delta V''$ has been set at the point 244 as a difference of the dead zone a $\Delta V_{OFF}$ from the front and rear road wheel rotational speed difference $\Delta V$ and the clutch torque output value $T\Delta V_{OUT}$ is set at the point 254 at a value equal to the unit protection torque $T\Delta V'$ ($= K_h\cdot\Delta V'$). Thus, the transfer clutch 28 is engaged under a force corresponding to the clutch torque output value $T\Delta V_{OUT}$, as shown in FIG. 7. Since the dead zone $\Delta V_{OFF}$ is set according to the tire diameter difference $\Delta r$ and the vehicle speed $V_i$, it is possible to eliminate the influence of the front and rear road wheel rotational speed difference caused by the combination of the tire diameter difference and the vehicle speed on the front road wheels 12 so that the drive from the engine can be distributed according to the corrected front and rear road wheel rotational speed value $\Delta V'$ which is substantially equal to the drive wheel slip information. It is apparent from a study of FIGS. 6 and 7 that the clutch torque $T\Delta V_i'$ is smaller than the clutch torque $T\Delta V_i$ for the same front and rear road wheel rotational speed difference $\Delta V_i$ where $T\Delta V_i$ is the clutch torque obtained when no difference exists between the diameters of the tires of the front and rear road wheels 12 and 14 of the vehicle 10 and $T\Delta V_i'$ is the clutch torque obtained when the tires of the front and rear road wheels 12 and 14 of the vehicle 10 have different diameters. A command is produced to gradually shift the clutch torque $T\Delta V$ to the unit protection torque $T\Delta V'$ when the unit protection torque $T\Delta V'$ is set.

When the vehicle speed increases and the clutch torque ($K_h\cdot\Delta V'$) calculated based on the corrected value $\Delta V''$ of the front and rear road wheel rotational speed difference exceeds the maximum clutch torque ($a\cdot Vi + b$), the maximum clutch torque ($a\cdot Vi + b$) is set for the unit protection torque $T\Delta V''$ at the point 246. The maximum clutch torque ($a\cdot Vi + b$) is indicated in FIG. 5 by the solid line extending in parallel with and on the lower temperature side of a constant temperature line indicated by the one-dotted line. The constant-temperature line is a line on which the oil temperature remains at 180° C. In this case, the unit protection torque $T\Delta V''$ equal to the maximum clutch torque ($a\cdot Vi + b$) is set for the clutch torque output value $T\Delta V_{OUT}$ at the point 254. As a result, the transfer clutch 28 is engaged under a force corresponding to this clutch torque output value $T\Delta V_{OUT}$. Consequently, the clutch torque is limited below the maximum clutch torque (a.Vi+b) which decreases as the vehicle speed $V_i$ increases. This is effective to prevent the oil temperature from increasing over an acceptable range.

It is now assumed that the vehicle 10 is running at an increasing speed $V_i$ with a 20 mm difference between the diameters of the tires of the front and rear road wheels 12 and 14. As the vehicle speed $V_i$ increases, the clutch torque TΔV increases until it reaches the maximum clutch torque. When the vehicle speed $V_i$ further increases, the clutch torque TΔV decreases along the line (a.Vi+b), as shown in FIG. 5. This is effective to prevent the oil temperature from increasing above an acceptable temperature, for example, 180° C.

While the invention has been described in connection with a 4WD vehicle where the rear wheels are the primary drive wheels and the front wheels are the secondary drive wheels, it is to be understood that the invention is also applicable to another 4WD vehicle where the front wheels are the primary drive wheels and the rear wheels are the secondary drive wheels.

What is claimed is:

1. A torque split control apparatus for use with an automotive vehicle including an engine for producing a drive, the automotive vehicle being supported on a pair of primary drive wheels each provided with a tire having a first tire diameter and a pair of secondary drive wheels each provided with A tire having a second TIRE diameter, the apparatus comprising:

means for transmitting the drive from the engine to the primary drive wheels and to the secondary drive wheels through a torque distributing clutch, operable on oil, for varying a torque transmitted to the secondary drive wheels;

means for sensing a wheel speed difference between speeds of rotation of the primary and secondary drive wheels;

means for sensing a vehicle speed;

means for sensing a difference between the first tire diameter and the second tire diameter;

means for calculating a dead zone as a function of tire diameter difference and vehicle speed, the calculated dead zone increasing as the sensed tire diameter difference increases and as the sensed vehicle speed increases;

means for subtracting the calculated dead zone from the calculated wheel speed difference to correct the wheel speed difference;

means for calculating a torque based upon the corrected wheel speed difference;

means for selecting a smaller one of the calculated torque and a maximum torque; and means for controlling the torque distributing clutch to transmit the selected torque to the secondary drive wheels;

wherein the maximum torque decreases as the sensed vehicle speed increases to prevent the temperature of the oil from increasing above a predetermined value.

2. The torque split control apparatus as claimed in claim 1, wherein the maximum torque is selected such that the temperature of the oil is constant.

3. The torque split control apparatus as claimed in claim 1, wherein the maximum torque is selected such that the temperature of the oil remains below a selected temperature.

* * * * *